(12) United States Patent
Chiaretti et al.

(10) Patent No.: US 7,676,120 B2
(45) Date of Patent: Mar. 9, 2010

(54) OPTICAL PHASE SHIFT DEVICE AND ANTENNA SYSTEM UTILIZING SAME

(75) Inventors: Guido Chiaretti, Novate Milanese (IT); Antonio Fincato, Cameri (IT)

(73) Assignee: STMicroelectronics s.r.l., Agrate Brianza (MI) (IT)

( * ) Notice: Subject to any disclaimer, the term of this patent is extended or adjusted under 35 U.S.C. 154(b) by 0 days.

(21) Appl. No.: 12/372,583

(22) Filed: Feb. 17, 2009

(65) Prior Publication Data

US 2009/0179798 A1    Jul. 16, 2009

Related U.S. Application Data

(62) Division of application No. 11/358,737, filed on Feb. 21, 2006, now Pat. No. 7,580,592.

(30) Foreign Application Priority Data

Feb. 22, 2005    (IT) .......................... MI2005A0277

(51) Int. Cl.
*G02F 1/035*    (2006.01)
*H01Q 1/06*    (2006.01)

(52) U.S. Cl. .................. 385/3; 385/2; 385/1; 385/12; 385/14; 343/720; 343/721

(58) Field of Classification Search .................. 385/1, 385/2, 3, 12, 14, 40, 41; 342/372; 398/141; 250/227.21; 343/720, 721, 778, 711
See application file for complete search history.

(56) References Cited

U.S. PATENT DOCUMENTS

| | | | |
|---|---|---|---|
| 4,814,774 A | 3/1989 | Herczfeld | 342/372 |
| 5,267,336 A * | 11/1993 | Sriram et al. | 385/2 |
| 5,963,034 A | 10/1999 | Mahapatra et al. | 324/244.1 |
| 6,163,633 A | 12/2000 | Ueda | 385/16 |
| 6,563,966 B1 * | 5/2003 | Tang | 385/10 |
| 6,788,718 B1 * | 9/2004 | Gidon et al. | 372/32 |
| 6,928,199 B2 | 8/2005 | Galstian et al. | 385/10 |
| 7,480,423 B2 * | 1/2009 | Seguin et al. | 385/1 |
| 7,580,592 B2 * | 8/2009 | Chiaretti et al. | 385/1 |
| 2003/0137999 A1 | 7/2003 | Spiegelberg et al. | 372/6 |
| 2009/0179798 A1 * | 7/2009 | Chiaretti et al. | 342/372 |

* cited by examiner

*Primary Examiner*—Brian M Healy
(74) *Attorney, Agent, or Firm*—Hogan & Hartson LLP

(57) ABSTRACT

A phase shift device of an optical fiber signal includes an actuator for changing the signal phase in at least one fiber portion by inducing the phase change by thermo-optical effect. An antenna system incorporating phase shift devices using the thermo-optical effect find particular utility in automotive and telecommunications fields.

17 Claims, 5 Drawing Sheets

OPTICAL PHASE SHIFT DEVICE AND ANTENNA SYSTEM UTILIZING SAME

RELATED APPLICATION

The present application claims priority of U.S. patent application Ser. No. 11/358,737 filed Feb. 21, 2006, which claims priority of Italian Patent Application No. MI2005A000277 filed Feb. 22, 2005, both applications being incorporated herein in their entireties by this reference.

FIELD OF THE INVENTION

The present invention relates to phase shift devices for optical signals and, particularly, to phase shift devices for signals travelling through optical fibers.

BACKGROUND OF THE INVENTION

Phase shift devices are capable of introducing a change in phase, or generally a time delay, in an optical fiber signal and are mainly used in the communication field, with those systems where mutually phase-shifted signals are required to be processed.

Particularly, devices are known which change the phase of a signal travelling through an optical fiber by means of an elasto-optical effect. This effect provides that the refractive index of the fiber core is changed by means of a mechanical action (either of elongation or stress) applied on the fiber. Changing the refractive index implies changing the optical path seen by the signal, the latter thus experiencing a different phase shift from prior to changing the refractive index.

An example of a phase shifter employing the elasto-optical effect is disclosed in U.S. Pat. No. 4,814,774. This document describes a phased-controlled antenna system and comprising: a laser source, a signal modulator, a splitter, a plurality of optical fiber connections, a phase controller and an array of antenna elements.

The optical signals reaching each element in the array have such mutual phase relationships that the radiation beam emitted from the array antenna has a predetermined shape and a predetermined orientation. The mutual phase shift among the signals of each connections can be introduced and changed using the phase controller, which operates by means of elasto-optical effect thereby controlling cylindrical piezoelectric crystals having the individual fibers coiled thereon. The piezoelectric crystals, after an electric voltage has been applied thereto, expand their circumference, and consequently cause a stress on the coils in which the fiber is wound, thereby changing the refractive index of the latter.

The phase delay introduced on each fiber connection depends on the number of windings and the stress action to which the fiber is subjected by the voltage-controlled piezoelectric crystal. Thereby, an optical beam scanning is outputted from the array antenna. In this document of the prior art, magnetoresistive and electro-mechanical elements are mentioned alternatively to the piezoelectric crystals proposed.

This type of devices, which operate by elasto-optical effect, are difficult to control and, following their operation, the phase delay introduced in the fiber is not observed in a sufficiently short time. Furthermore, manufacturing these devices is relatively complicated.

SUMMARY OF THE INVENTION

The object of the present invention is to provide a phase shift device which is alternative to those of the prior art and, for example, has a non-complicated structure and control mode, also ensuring a satisfactory response time.

This object is achieved by a phase shift device as in which an actuator which is adapted to change the signal phase in at least one fiber portion by inducing the phase change by thermo-optical effect. In embodiments of the present invention, the actuator of the present invention is incorporated into an antenna system.

BRIEF DESCRIPTION OF THE DRAWINGS

The invention will be better understood from the following detailed description of a preferred embodiment thereof, which is given by way of example with reference to the annexed figures, in which.

DETAILED DESCRIPTION

Figure 1:
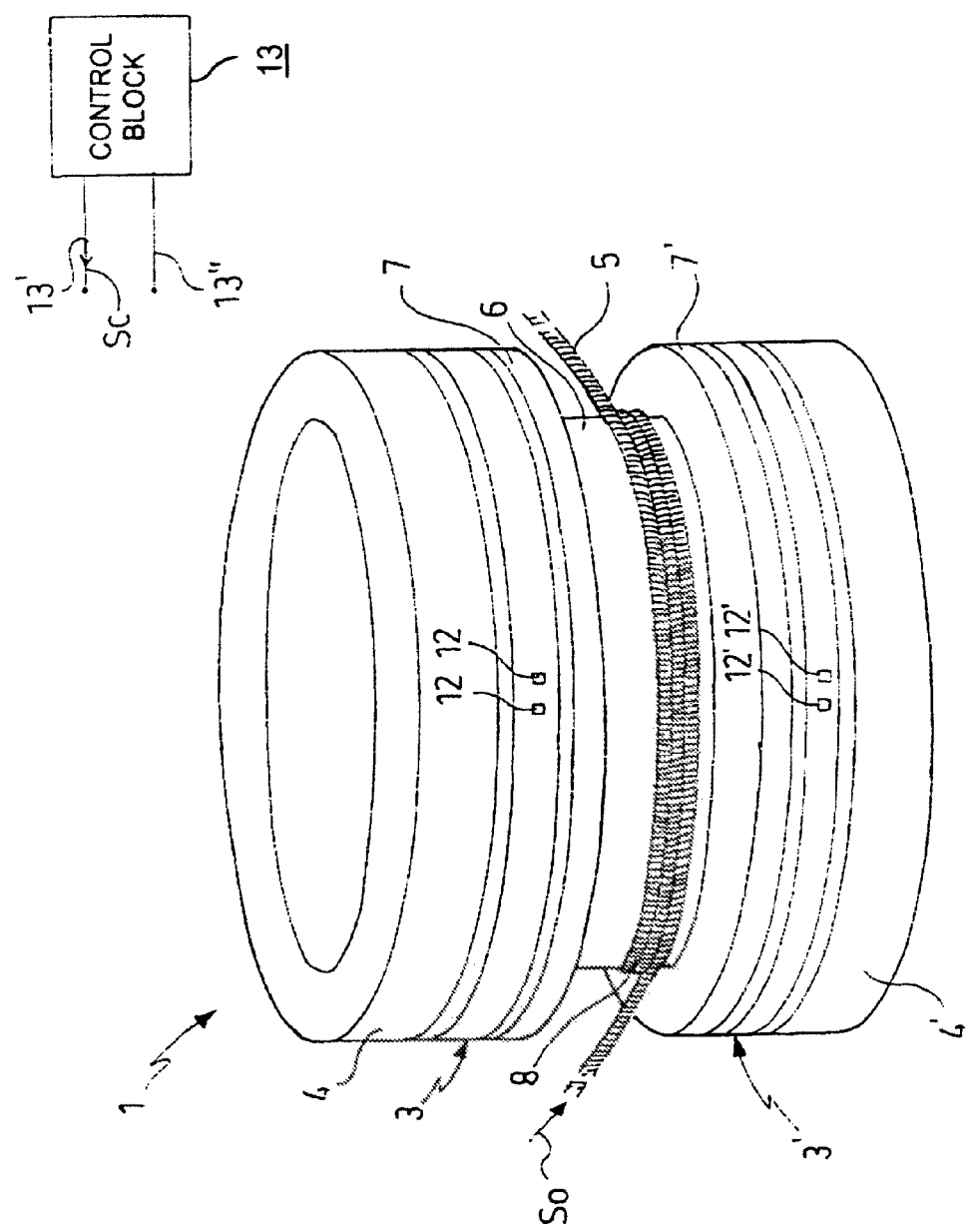
FIG. 1 is a perspective schematic view of a phase shift device according to a particular embodiment of the invention.
Figure 2:
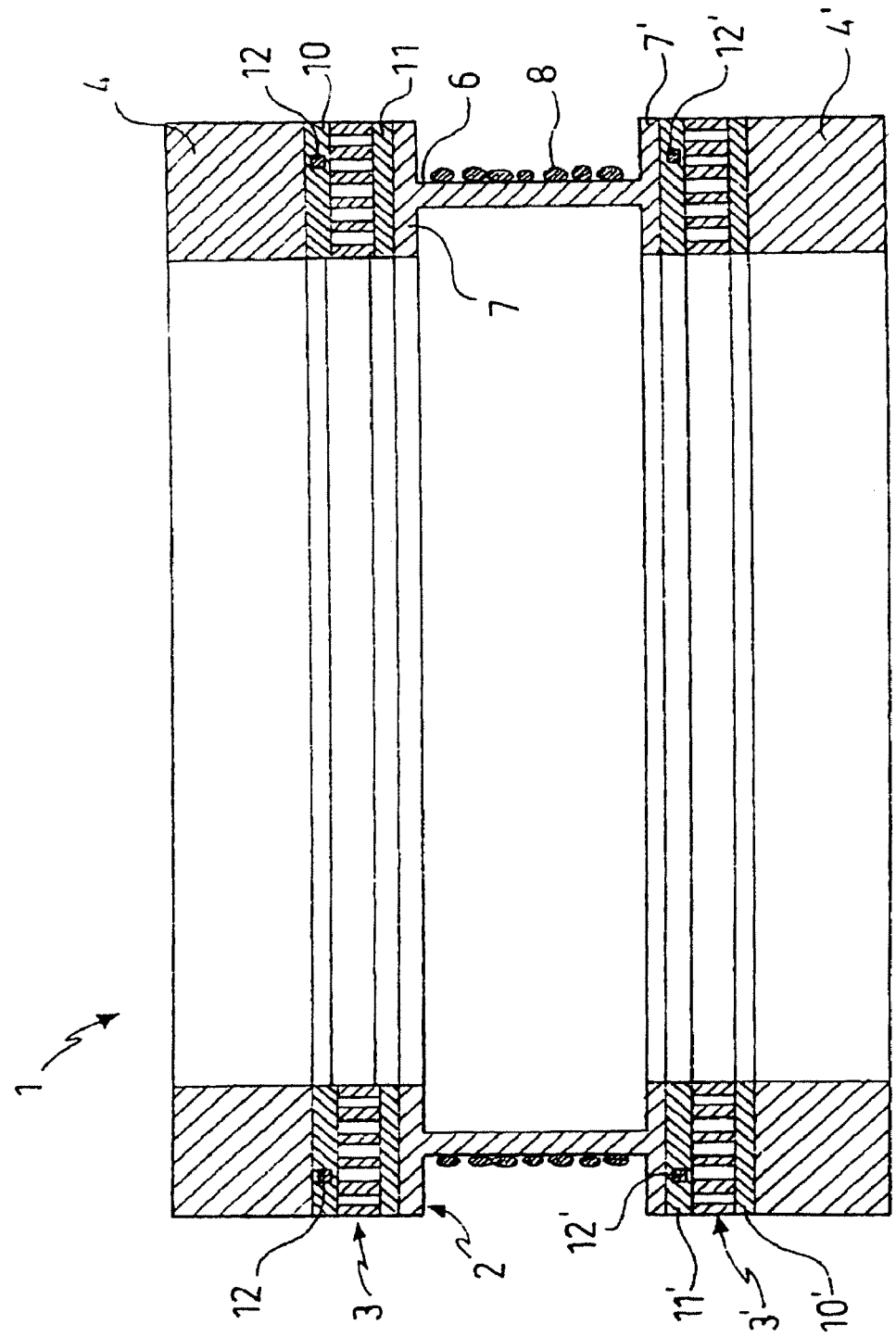
FIG. 2 is a sectional view of the phase shift device shown in FIG. 1.

In FIGS. 1 and 2 is shown a phase shift device 1 is shown, for a particular embodiment of the invention. This phase shift device 1 has the function of changing the phase of an optical signal So that travels through an optical fiber 5. The phase shift device 1 is provided with actuating means capable of introducing the phase change by a thermo-optical effect.

In greater detail, and according to the example in the figures, these actuating means comprise at least one Peltier thermoelectric cell actuator 3 (hereinafter called thermoelectric actuator 3, for brevity), a heat sink 4 being associated thereto.

Furthermore, the phase shift device 1 comprises a support member 2, which is mechanically connected to the thermoelectric actuator 3, and being such as to support a portion of the optical fiber 5.

Preferably, the support member 2 is a reel of metallic material (or other thermally conductive material) being advantageously ring-shaped or cylinder-shaped and comprising an outer side wall 6 and two annular base walls 7 and 7'. Around the side wall 6 of the reel 2 there is wound a portion of the optical fiber 5 such that one or more coils 8 are formed. The support member 2 may have a different shape from the reel shown in the figures and, for example, instead of the side wall 6, it may have a series of vertical stakes arranged between the two base walls 7 and 7' such that they are functional for coiling the optical fiber 5.

The optical fiber 5 may be of a conventional type, such as a silica ($SiO_2$) optical fiber having a core characterized by a refractive index "n", a cladding and an outer coating. The coils 8, having a total length that will be indicated with L hereinafter, are a portion of the fiber 5 with refractive index to be conditioned by means of a thermo-optical effect.

Figure 3:
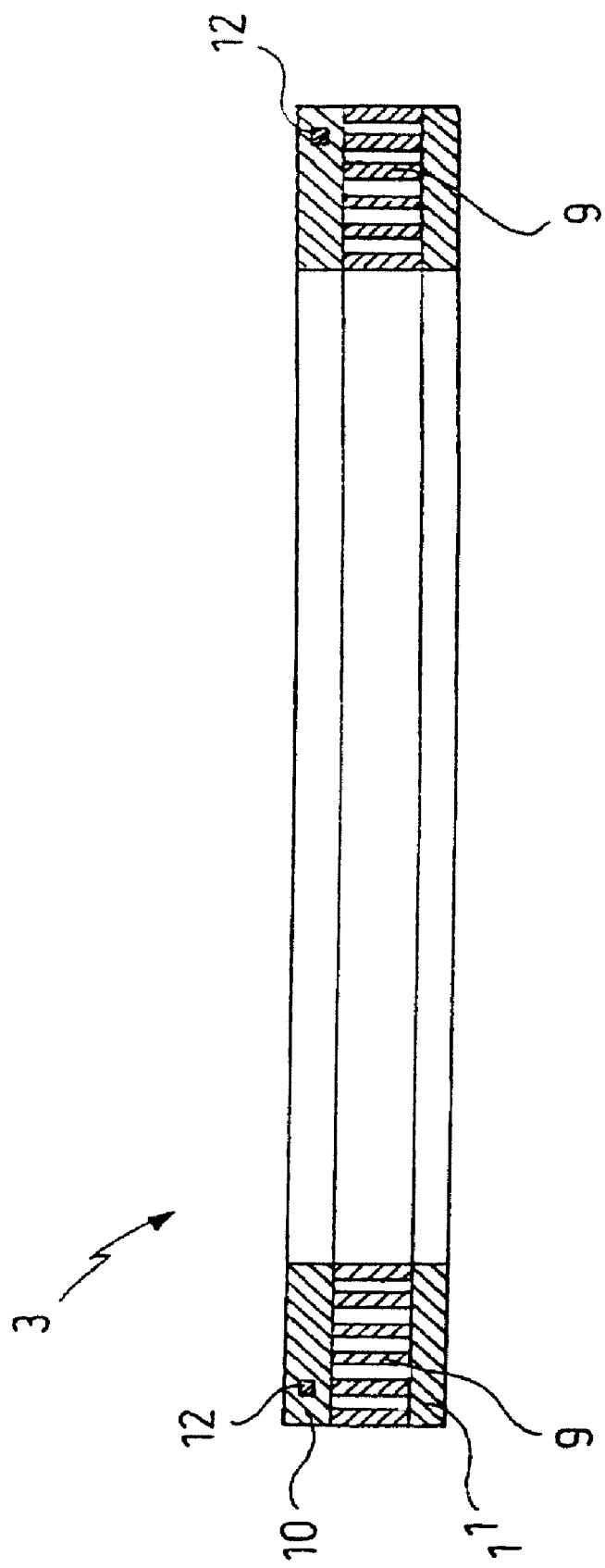
FIG. 3 is a sectional view of a thermoelectric actuator to be employed in the phase shift device shown in FIG. 1.

Reference is made again to the thermoelectric actuator 3, shown in greater detail in FIG. 3. This thermo-electric actuator comprises a plurality of Peltier cells 9 (e.g., electrically serially connected to each other), which are interposed between a first plate 11 and a second plate 10 of a conductive material (such as alumina), two terminals or connections 12 for applying an electric control signal being connected thereto.

The operating principle of the thermoelectric actuator 3, fully similar to that of conventional thermoelectric actuators is the following: by applying the electric control signal a potential difference is generated at the ends of the Peltier cells 9, to which there corresponds the heating of one of the two plates (such as the first plate 11) and the cooling of the second plate 10, or vice versa.

The thermoelectric actuator 3, accordingly, allows an electric signal to be turned to a difference of temperature between the two plates 10 and 11. This phenomenon is reversible, that is, if the electric signal is such as to reverse the direction of the electric current of the actuator, the first plate 11 is cooled and the plate 10 is heated.

Particularly, by changing the characteristics of the electric control signal, the temperature assumed by each of the two plates 10 and 11 can be adjusted. As stated above, the thermoelectric actuator 3 is such that it exchanges heat (either directly and/or by means of the reel 2) with the coils 8 of the fiber 5 thereby inducing a refractive index change by thermo-optical effect. As is known by those skilled in the art, the refractive index "n" of an optical fiber core depends on the optical fiber temperature. The thermo-optical effect is the refractive index change n that is conditioned by a temperature change.

The Peltier-cell thermoelectric actuator 3 is particularly advantageous in that it ensures short response time and can be easily implemented. According to the particular embodiment such as described, the thermoelectric actuator 3 is generally ring-shaped and is fixed to the reel 2 such that the first plate 11 faces the base wall 7 of the reel, and thus faces the coils 8 of the optical fiber 5. Several fixing techniques can be used, with the proviso that a good thermal contact is provided. Among these techniques there are, for example, welding, gluing by means of thermally-conductive glue, or pressing by means of screws or clamps, optionally by interposing a conductive paste.

The heat sink 4 (e.g., ring-shaped) is fixed to the second plate 10 of the thermoelectric actuator 3, i.e. to the plate facing away from the coils 8. The fixing is obtained by means of similar techniques as discussed above. This heat sink 4 facilitates heat release from the second plate 10 and can be made of metallic material (such as aluminium or copper), or other suitable material.

According to the preferred embodiment as shown in FIGS. 1 and 2, the phase shift device 1 further comprises an additional thermoelectric actuator 3', which is provided with a corresponding additional heat sink 4', for example, identical to the thermoelectric actuator 3 and heat sink 4. The additional actuator 3' and the additional heat sink 4' comprise similar components as those described above for the actuator 3 and the heat sink 4. These components are designated in FIGS. 1 and 2 with the same reference numbers being employed for the components of the actuator 3 and the heat sink 4, but followed by the symbol "'". For example, the additional actuator 3' fixed to the base wall 7' of the reel 2 comprises a respective first plate 11' and a respective second plate 10'.

Using the additional thermoelectric actuator 3' (having the respective first plate 11' facing the coils 8) allows obtaining a particularly uniform heating/cooling of the coils also when a great number of coils 8 is wound on the reel 2.

Preferably, the phase shift device 1 is provided with a control block 13 (schematically illustrated in FIG. 1) having electric terminals 13' and 13" and suitable to generate an electric control signal Sc that has to be sent to the connections 12 and 12' of the thermoelectric actuators 3 and 3'. The two actuators 3 and 3' are electrically, e.g. serially, connected to the control block 13.

An exemplary operation of the phase shift device 1 is now described. Reference should be made to an optical signal So travelling through the fiber 5 and having an electric field E, the amplitude and phase thereof varying along the fiber 5 according to known relationships describing the propagation through optical fiber. While it travels through the tract of coils 8 of total length L, the optical signal experiences a phase shift both related to the refractive index "n" of the fiber core 5 and the length L. In accordance with this example, assume that a change $\delta\phi$ in the phase shift experienced by the optical signal So travelling through the coils 8 of total length L is desired to be obtained by means of the control electric signal Sc (generated by the control block 13).

Based on this value $\delta\phi$ (or the corresponding time delay $\delta\tau$), the corresponding refractive index change $\delta n$ capable of introducing said phase shift change is estimated by means of formulae known to those skilled in the art.

By knowing the characteristics of the optical fiber 5 used and the relationships describing the thermo-optical effect, the temperature variation $\Delta T$ required to induce said index change $\delta n$ is estimated. These relationships describing the thermo-optical effect have been reported in an exemplary dimensioning at the end of the present description.

The parameters (such as current, voltage, dynamics) of the electric signals Sc to be applied to the thermoelectric actuators 3 and 3' ensuring said temperature change in the first plates 11 and 11' can be selected based on the temperature delay $\Delta T$. When the control electric signal Sc having the parameters calculated above is applied to the thermoelectric actuators 3 and 3', by means of the terminals 12 and 12', the two plates 11 and 11' change their temperature from an initial value $T_0$ to a final value $T_0+\Delta T$. The plates 11 and 11' induce a similar temperature change in the coils 8 (also by means of the heat conduction carried out by the reel 2): substantially equal to $\Delta T$. This temperature change in the coils 8 implies, by thermo-optical effect, the change $\delta n$ in the refractive index n of the fiber core with the consequent change $\delta\phi$ in the phase shift experienced by the optical signal So travelling through the tract of length L.

When another value is desired for the phase shift change $\delta\phi_1$, a control signal Sc is applied which is capable of imposing a different voltage value to the terminals 12 and 12' of the thermoelectric actuators 3 and 3'. This operation can correspond to an increase or a decrease in the temperature achieved before.

It should be understood that the possibility of inducing a change in the time of the phase shift experienced by the optical signal So in the tract of length L, corresponds to the possibility of changing the phase of the optical signal along any section in the tract of optical fiber 5 that follows the coils 8 according to the direction of propagation.

According to another embodiment of the invention (hereinafter defined as "feedbacked"), the control block 13 does not operate by generating a signal Sc that behaves in a preset manner, but operates as a control block inserted in a loop or feedback circuit. In this case, the feedback loop also comprises, for example, a temperature transducer (not shown) for measuring, or detecting, the temperature value reached by the coils 8. This transducer may be a conventional thermistor such as, preferably, a surface resistor ensuring good thermal contact with the reel 2 supporting the coils 8. The thermistor is suitably welded to the reel 2 and has two electric conductors for transferring to the feedbacked control block (with minimum time delay) an electric measuring signal indicating the temperature reached by the coils 8. Advantageously, this type of resistor has a very low resistance (e.g., a few tenths of Ω) such that the behaviour of the thermoelectric actuators 3 and 3' is not affected.

The control block 13, based on the electric measuring signal, is capable of generating a control signal Sc acting on the thermoelectric actuators 3 and 3' to cause a consequent temperature change in the first plates 11 and 11'. For example, it can be established that the control block 13 generates such a control signal as to keep the phase shift experienced by the optical signal So substantially constant in the coils 8 upon ambient temperature changes.

According to a further embodiment of the invention, the thermo-optical effect can be obtained by employing, alternatively to at least one of the Peltier-cell thermoelectric actuator 3 and 3', a resistor heating the reel 2 and the coils 8 by the Joule effect.

Figure 4:
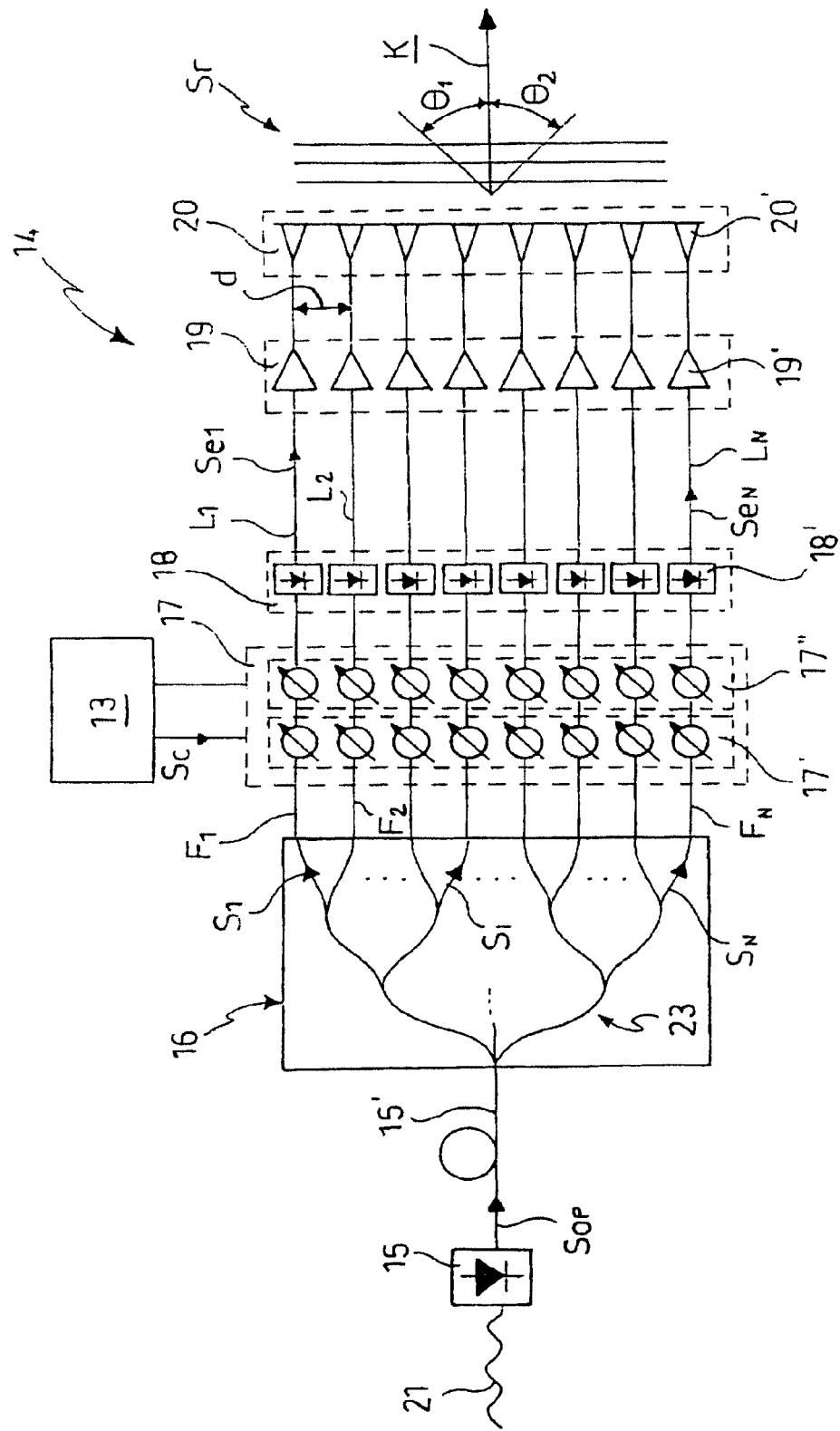
FIG. 4 is an example of an antenna system comprising a phase shift apparatus according to the invention.

With reference to FIG. 4 there is described an exemplary antenna system 14 employing phase shift devices similar to that described above. According to the exemplary embodiment of the invention as shown in FIG. 4, the system 14 implements the functionalities of a radar (Radio Detection And Ranging).

The radar system 14 comprises (from left to right): an optical signal source 15 provided with a splitter 16; a phase shift apparatus 17; a conversion block 18; an amplification block 19 and an array antenna 20.

The source 15 is a conventional source of optical signals, such as a laser diode, amplitude-modulated at its operating frequency (for example 24 GHz) being directly supplied by means of an input electric signal 21 such as to generate an optical signal Sop. The laser diode 15 is optically coupled to the splitter 16 by means of a guided path 15', such as, preferably, an optical fiber.

Alternatively to the direct modulation of the source 15, an external (and thus indirect) modulation of the optical signal Sop emitted by the laser diode may be provided, such as by means of an electro-optical modulator (not shown), which acts on the optical path 15'.

The optical splitter 16, which is well known to those skilled in the art with the term "splitter", comprises an input coupled to the optical path 15' and a plurality of optical paths (generally indicated with 23) connecting the input to a plurality of outputs. The plurality of outputs of the splitter 16 is coupled to a plurality of N optical fibers F1-FN. The function of the splitter 16 is to split the amplitude of the input optical signal Sop thereby providing a corresponding plurality of optical signals S1-SN to the plurality of optical fibers F1-FN. According to an exemplary embodiment, the optical paths 23 do not introduce relative phase shifts among the output optical signals. The splitter 16 shown in FIG. 4 splits the optical signal received from path 15' into eight signals, one for each path of the plurality of optical fibers F1-FN. The splitter 16 is preferably integrated in a Planar Lightwave Circuit PLC according to one of the conventional planar technologies.

Figure 5:
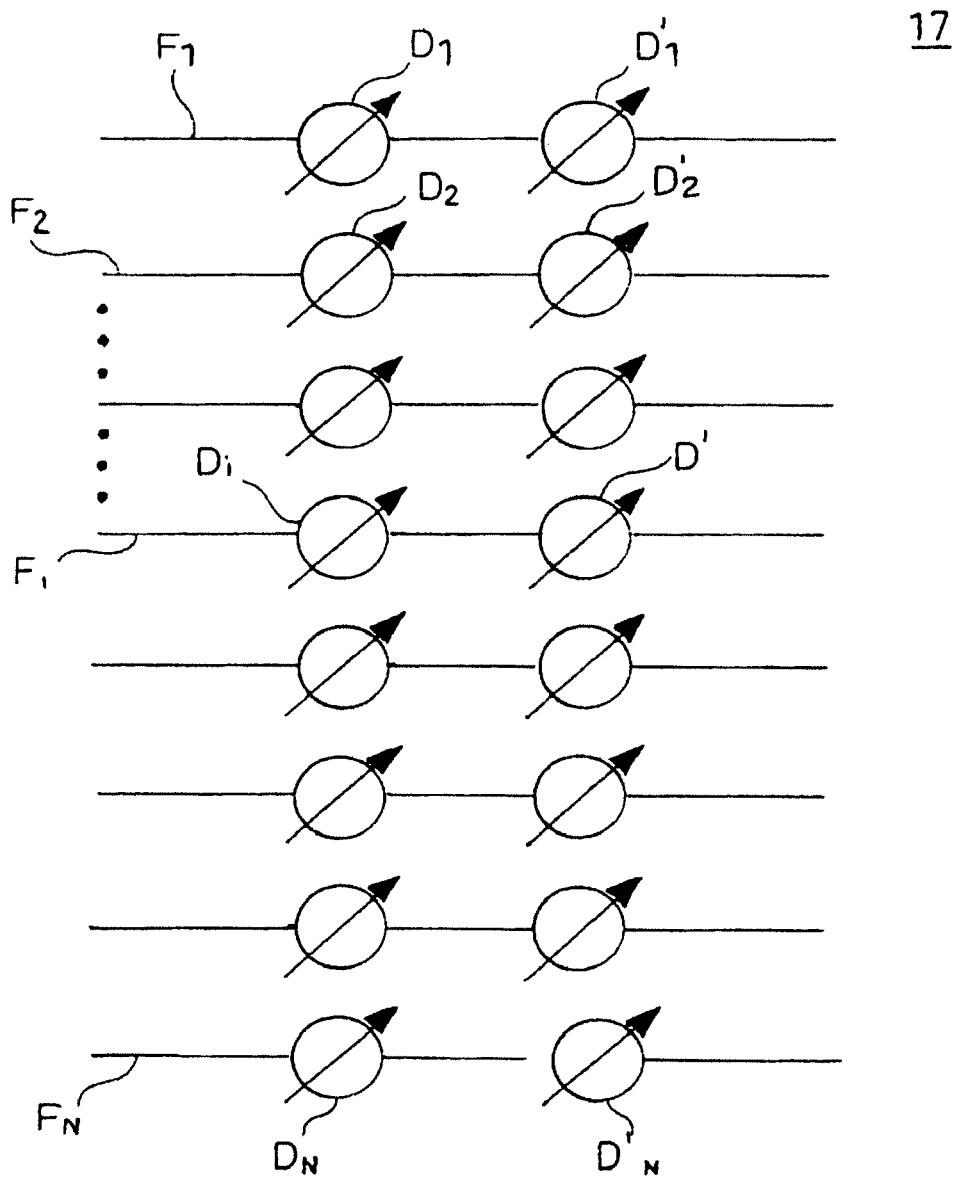
FIG. 5 shows an exemplary embodiment of said phase shift apparatus.

The phase shift apparatus 17, which is shown in greater detail in FIG. 5, comprises a first plurality 17' of phase shift devices D1-DN and, advantageously, a second plurality 17" of phase shift devices D1'-DN'. Each of the phase shift devices D1-DN and D1'-DN' is similar to the phase shift device 1 described above.

According to a first embodiment, each of the phase shift devices D1-DN and D1'-DN' is provided with a respective reel 2 supporting a corresponding portion of one of the optical fibers F1-FN outputted from the splitter 16 and including two thermoelectrical actuators 3 and 3' and the heat sinks 4 and 4' thereof. The phase shift devices of the first plurality D1-DN (of the second plurality D1'-DN') act by thermo-optical effect on optical fiber portions of different lengths from each other such that a distinct phase shift change is introduced in the respective optical signal S1-SN.

Particularly, on the reels of each device of the first plurality D1-DN there is wound a distinct number of coils. According to an exemplary embodiment of the system 14, there is an increase (decrease) in the number of coils wound on each reel from the phase shift device D1 (D1') to the DN (DN'). More particularly, with n1 is designated the number of coils of a portion of the first optical fiber F1 being wounded about the reel of the first phase shift device D1 and with "i" is designated the index identifying each optical fiber (i=1, 2, . . . , N).

A portion of the second fiber F2 is wounded about the respective phase shift device D2 according to a number of coils n2=2 n1. Generally, the i-th fiber F1 is wound about the respective reel of the phase shift device Di, according to a number of coils ni=i·n1. For example, considering N=8 and n1=1, the following applies: the first device D1 conditions an individual coil, the second device D2 conditions a number of coils n2=2, and so on to the eighth device D8 that conditions a number of coils n8=8.

According to the example described, each of the phase shift devices D1'-DN' has the same number of coils wound about the corresponding reel as the devices DN-D1, respectively. In other words, the number of coils of the device D1' is equal to that of the device DN, the number of coils of the device D2 is equal to that of the device D7 and, in general, the number of coils ni' of the phase shift device Di' is: ni'=(N−i)·n1 (where, N, i and n1 are as defined above). For example, N can take a value of 8.

This particular distribution of the number of coils between the first and second plurality of phase shift devices D1-DN and D1'-DN' ensures that the total length of the portions of each fiber F1-FN to be conditioned by the respective phase shift devices (D1 and D1' for the first fiber F1; Di and Di' for the i-th fiber Fi) is the same for each fiber.

It should be understood that the above description of the relationships (of the "geometric progression" type) that correlate the number of coils refers to the particular case where the individual coils have the same length l. It should be noted that other different criteria for the allocation of the number of coils, either employing or not a geometrical progression, are also possible.

In addition, advantageously, the phase shift devices D1-DN and D1'-DN', which are distinct from each other, are provided such as to be suitably thermally isolated from each other.

It should be observed that the first plurality of phase shift devices D1-DN may also not be made with distinct phase shift devices, but each fiber F1-FN may be wounded with the respective number of coils on an individual reel 2 interposed between the thermoelectrical actuators 3 and 3' (or between the resistors with Joule effect) being provided with the respective heat sinks 4 and 4'. Advantageously, in this case, the fibers F1-FN are wound on regions being spaced apart on the same reel such that no mechanical stress is induced on the respective coils and heat exchange is distributed in an optimum manner. It should be understood that, for the second plurality of phase shift devices D1'-DN', an individual reel common to all fibers may be employed.

In this application, according to which the system 14 is a radar, the control block 13 is provided having the function of controlling the phase shift apparatus 17. The control block 13 is electrically connected to the phase shift apparatus 17 and is capable of providing the same with the electric signal Sc that, by means of the thermoelectrical actuators 3 and 3' included in the phase shift devices D1-DN and D1'-DN', causes the thermo-optical effect in order to change the refractive index of the respective coils of the optical fibers F1-FN. The control block 13 can comprise a microprocessor operating according to a preset processing program.

Referring back to the description of the system 14 from FIG. 4, each optical fiber F1-FN outputted from the phase shift apparatus 17 is connected to the conversion block 18. This conversion block 18 comprises a plurality of photosensitive members, such as photodiodes 18', each being coupled to a respective fiber of the plurality F1-FN. Each photosensitive member 18' is capable of detecting an optical signal and turning the same to a corresponding electric signal (Se1-SeN) with the same frequency as the input electric signal 21 modulating the laser diode 15.

When the laser diode 15 is modulated by means of an external modulator (not discussed herein) the electric signals Se1-SeN have the same frequency as the external modulation signal that modulates the optical radiation produced by the laser diode 15.

Preferably, the input electric signal 21 has a microwave frequency and comprises a carrier component and a signal component carrying the information.

It should be noted that, when required by the application of system 14, the optical fibers F1-FN extending from the outputs of splitter 16 to the photosensitive elements 18' have the same physical length.

Preferably, the conversion block 18 is electrically connected, by means of a plurality of lines L1-LN, to the amplification block 19 comprising N amplification elements 19' (such as amplifiers made with integrated technology), i.e. it comprises one amplifying element for each electric line L1-LN. In FIG. 4 reference is made to an exemplary case where the carrier component of the input electric signal 21 (and accordingly, the frequency of the electric signals Se1-SeN) is in the microwave field (such as ranging from 20 to 30 GHz) and is thus suitable for subsequent radiation.

For those carrier frequency values of the input electric signal 21 that are not suitable for radiation, frequency converters may also be provided which adjust the frequency value of the electric signals Se1-SeN before radiating the same.

Each amplification element 19' is electrically connected (by means of a respective electric line L1'-LN') to a corresponding antenna element 20' (such as, conventional microwave horns) of the array antenna 20.

Each of the antenna elements 20 allows irradiating the inputted electric signal with a determined amplitude and a phase in the free space. As is known in the array antenna theory, the signals of the individual antenna elements 20' combine (by means of destructive or constructive interference) thereby generating an irradiated signal Sr (only schematically illustrated in FIG. 4), the radiation solid thereof (which comprises one or more light lobes) having such a shape and orientation in the space as a function of the amplitudes and phases of each of the signals irradiated by the antenna elements 20'. According to the applications of the system 14, those skilled in the art will be able to design and select the number, type, size and mutual position of antenna elements 20'.

The array antenna 14, with radar functionality, is completed by a receiving block, not illustrated in the figures, which is preferably arranged upstream of the array antenna 20 that acquires, by means of the individual antenna elements 20', those component of the irradiated signal Sr which are reflected by possible obstacles.

The receiving block can be made on the same integrated circuit as the conversion block 18 and the amplification block 19.

The operation of the antenna system 14 with radar functionality will be now described. It should be considered that in the radar-operating mode it is advantageous that the orientation of the radiation solid associated to the irradiated signal Sr is changed over time such that a scanning of at least one sector of the involved space is carried out.

The radar system 14 allows carrying out this space scanning by holding the antenna elements 20' in a fixed position and acting only on the phases of those signals being irradiated from each antenna element by means of the phase shift apparatus 17. In FIG. 4, the irradiated signal Sr is illustrated by means of the wave fronts thereof in a schematic and merely qualitative manner. In addition, in FIG. 4 there is indicated the main-lobe axis K of the radiation diagram. Therefore, to carry out space scanning, the main-lobe axis K is deflected on one or more scanning planes according to a predetermined scanning principle. For example, a deflection of the main-lobe axis K is carried out within an angular sector with $\Theta_1+\Theta_2$ total angular amplitude.

Particularly, the deflection of the main-lobe axis K occurs in the initial position as illustrated in FIG. 4 such that the $\Theta_1$ angular amplitude sector is swept, and then it returns to the initial position. Subsequently, the $\Theta_2$ angular amplitude sector is swept, and then it returns to the initial position. For example, the angles $\Theta_1$ and $\Theta_2$ are equal to each other and of 10°.

Consider an initial condition, for example, corresponding to the initial position of the main-lobe axis K being indicated in FIG. 4. The operation of the system 14 in this initial condition provides that an input electric signal 21 directly modulates the laser diode 15, which emits the optical signal Sop travelling through the optical path 15'. This optical signal Sop is split by the splitter 16 into eight optical signals S1-S8. Each of these optical signals S1-S8 reaches the phase shift apparatus 17. For example, in the initial condition, the phase shift apparatus 17 is disabled and thus the optical signals S1-SN, when they travel through the fibers F1-FN, experience the same phase shift, since they have traveled through optical paths of the same length.

The individual phase shifted optical signals S1-SN are turned into electric signals Se1-SeN by the conversion block 18 and amplified by the amplifying block 19 (when provided). It should be observed that the electric signals Se1-SeN are also in phase relative to each other as the optical signals S1-SN from which they have been obtained.

On the antenna elements 20' of the array 20 there are provided electric signals Se1-Sen in phase relative to each other such that the various signals irradiated by each antenna element 20' are combined, thereby an radiation solid is originated having said main-lobe axis K.

To sweep the angular sector of amplitude $\Theta_1$, a control electric signal Sc is applied to the phase shift apparatus 17, which varies over time and such that it acts only on the first plurality of phase shift devices D1-DN, whereas the second plurality of phase shift devices D1'-DN' is not activated.

Advantageously, the control signal Sc is such that, at any instant of time, the coils conditioned by the first plurality of phase shift devices D1-DN (by means of the thermoelectric actuators thereof) are all brought to the same temperature. As a consequence that the number of coils to be conditioned by thermo-optical effect by each phase shift device D1-DN is different for each optical fiber F1-FN, different phase shifts are introduced for each of the optical signals S1-SN.

These phase shifts are, obviously, also provided on the electrical signals Se1-SeN, to which there corresponds an irradiated signal Sr having a main-lobe axis K deflected relative to the initial one as shown in FIG. 4. The variation over time of the control signal Sc implies such temperature variations over time as to carry out the scanning of the angular sector of amplitude $\Theta_1$.

In a complementary manner, to sweep the angular sector of amplitude $\Theta_2$ one has to act on the second plurality of devices D1'-DN', the first plurality of devices D1-DN not being activated. The possibility of sweeping the angular sector of amplitude $\Theta_2$ by means of the second plurality of devices D1'-DN' is due to the fact that the latter has a distribution of the number of conditionable coils among the optical fibers F1-FN that is complementary to that relative to the first plurality of devices D1-DN.

To activate the two pluralities of phase shift devices (first the plurality D1-DN and then D1'-DN') in succession, two control signals Sc can be provided in succession, advantageously, in a periodic shape (such as triangular or half-wave signals) opposing to each other.

By means of the receiving block presented above, the radar system 14 is also capable of detecting the signal reflected by an obstacle that comes in contact with the irradiated signal Sr during the scanning.

The radar system 14 described above is particularly suitable for automotive applications. To this purpose, the system 14 can be mounted on a car, for example on the front bumper thereof, such that the scanning plane coincides with the vehicle moving plane. A scanning of this type is employed to prevent crashes (the so-called pre-crash step) since this technique allows detecting the presence of any obstacle prior to the crash.

The radar system 14 in accordance with the invention is particularly advantageous since it has scanning times which depend on the response time of the phase shift devices used, which are very short and of a few split seconds, for example.

Another advantage of the system 14 is connected to the fact that it does not provide any mechanical movement or orientation of the elements in the array antenna. Thereby, the system 14 is light and small-sized when mounted on a car.

In addition to the automotive application, the radar system 14 can be employed in bio-engineering and military applications. For example, this system 14 can be applied for detecting weapons or metal objects that a person may hide underneath his/her clothes.

According to another embodiment of the invention, the array antenna 14 may not have radar functionality, but be a transmitting system capable of generating a radiation solid having constant lighting characteristics over time. In other words, according to this embodiment, space scanning is not required and, on the contrary, it is convenient that the generated radiation solid holds its characteristics (such as shape and/or orientation) constant over time.

In this case, the system 14 is not provided with the receiving block and can comprise only the first plurality of phase shift devices D1-DN (or only the second plurality D1'-DN'). In addition, the control block 13 does not operate by generating such a control signal Sc as to cause space scanning, but carries out a control of the phase shift apparatus 17 such that the temperature value reached by the conditionable coils of the optical fibers F1-FN is kept constant when the room temperature is changed.

In this case, the control is carried out in a similar manner as the control described above for the phase shift device 1 with relation to the feedbacked embodiment. The phase shift devices D1-DN, either made with different reels or with one reel in common, are provided with one or more temperature transducers (such as the so-called thermistors) for measuring, or detecting, the temperature value reached by the coils conditionable by the phase shift devices D1-DN.

The control block 13 is feedback-connected such as to take, by means of the thermistors, a temperature measuring signal provided on the fibers F1-FN and compare the same with a value set upon the design, thereby evaluating an error signal. Based on this error, the control block 13 will (or will not) send a new electric control signal to the phase shift apparatus 17 to bring the temperature back to the balance value.

The preferred application of such an antenna system 14 is in the field of communications. This application is typical of mobile phone networks.

Particularly, the antenna system 14 can be associated to a transmitter intended to send signals to receivers being in a fixed position. When another receiver is desired to be lighted or when the positions of the existing receivers are changed, the system 14 can be reconfigured by selecting a new temperature value to which the conditionable coils of the optical fibers F1-FN are to be brought, to introduce phase shift changes corresponding to the new orientation of the radiation solid. Since the array antenna 14 can be reconfigured, it can be used in the Terrestrial Smart Antenna systems.

It should be noted that the particular embodiment of the invention providing an allocation of the coil number according to said "geometric progression" is particularly advantageous since it allows obtaining different values for the phase shift introduced on the independent optical fibers F1-FN by applying the same temperature variation. This allows controlling the thermoelectric actuators 3 and 3', either associated to the common reel or the individual reels of the plurality of devices, by starting from an individual control signal Sc, thereby making the control mode particularly simple and effective.

Example Calculation of the Time Delay Between Adjacent Antenna Elements Described.

An exemplary calculation is described of the time delay $\Delta t\tau$ required to be provided between the electromagnetic signals (Se1-SeN) supplied to adjacent antenna elements in the array 20 in order to obtain a deflection of the main lobe axis equal to a sector of angular amplitude $\Theta=10°$.

The following magnitudes are further defined:

c speed of light in vacuum; $c=3\cdot 10^8$ ms$^{-1}$ f frequency of the signals Se1-SeN supplied to the antenna elements 20', in the example f=77 [Ghz] to which there corresponds a wavelength $\lambda=0.0039$ [m] (c=f$\lambda$);

d distance between adjacent antenna elements 20' belonging to the array 20 (shown in FIG. 4);

N number of antenna elements in an array antenna, according to the example N=10 and not 8 as shown in FIG. 4;

$\Theta$ amplitude of the deflection angular sector, in the example $\Theta=10°$.

Those skilled in the array antenna will appreciate the following characteristic relationship:

$$\Delta\tau = \frac{d\sin\Theta}{c} \quad (1)$$

In the example described, the distance d is selected to be equal to $\lambda=0.0039$ [m].

Thus, for the considered values, the relationship (1) gives the following time delay value:

$$\Delta\tau = \frac{d\sin\Theta}{c} = \frac{0.0039 \text{ m}\cdot\sin(10°)}{3.10^8 \text{ ms}^{-1}} \approx 2 \text{ ps} \quad (2)$$

For example, the time delay between the first and the last of the elements in the array antenna is obtained by multiplying the delay $\Delta\tau$ by the number of antenna elements constituting the array antenna (N=10) minus 1, hence $\Delta\tau$ is 18 ps. In general, the delay of the signal of the i-th antenna element relative to the signal of the first antenna element is $\Delta\tau(i-1)$, i ranging between 1 and N.

Example of Dimensioning the Length of Optical Fiber to be Conditioned by Thermo-Optical Effect With reference to the phase shift device 1 (shown in FIGS. 1 and 2), there is described an example of evaluation of the total length L of the coils 8 wound about a reel to be conditioned by thermo-optical effect. In this example, the relationships to be used for evaluating the length L of a portion of optical fiber wound about a reel that is required in order that a refractive index change $\delta n$ corresponding to a temperature variation $\Delta T=30°$ C. introduces 1 ps variation in the time delay $\delta\tau$ experienced by the optical signal So when it travels through the tract L.

The following magnitudes are defined:
c speed of light in vacuum; c=3×10$^8$ ms$^{-1}$
n refractive index of the optical fiber core, n=1.5;
t time delay experienced by the optical signal So in the tract of length L at the initial temperature To;
$\delta n$ variation in the refractive index obtained by thermo-optical effect, and corresponding to the temperature variation $\Delta T=30°$ C.;
$\delta\tau$ variation in the time delay desired to be introduced on the optical signal when it travels through the tract of length L, according to the example: $\delta\tau=1$ [ps]=10$^{-12}$ [s] (it is understood that this time variation corresponds to the variation in the phase shift $\delta\phi$ of the optical signal So according to the following relationship:

$$\delta\varphi = \frac{2\pi}{\lambda_o}c\delta\tau,$$

where $\lambda_o$ is the optical wavelength of the optical signal So).

The following relationships are known to those skilled in the art (as referred to the initial temperature To):

$$\frac{c}{n} = \frac{L}{t} \quad (3)$$

$$n = \frac{t\cdot c}{L} \quad (4)$$

following temperature variation $\Delta T$, there occurs the variation $\delta n$ of the refractive index of the fiber core and the relationship (4) is as follows:

$$n + \delta n = \frac{(t+\delta\tau)\cdot c}{L} = \frac{t\cdot c}{L} + \frac{\delta\tau\cdot c}{L} \quad (5)$$

The variation $\delta n$ can be expressed as:

$$\delta n = \frac{\delta\tau\cdot c}{L} \quad (6)$$

It should be noted that, by thermo-optical effect, the temperature variation $\Delta T$ and the variation $\delta n$ of the refractive index are correlated by the following relationship:

$$\delta n = \frac{\partial n}{\partial T}\cdot\Delta T \quad (7)$$

wherein $\frac{\partial n}{\partial T}$ is the thermo-optical coefficient of the fiber 5 that takes, for example, the value of $1.1\cdot 10^{-5}$ for the standard silica fibers for telecommunications.

Thus, for the considered values, the relationship (7) gives the following value for the variation $\delta n$ of the refractive index:

$$\delta n = \frac{\partial n}{\partial T}\cdot\Delta T = 1.1\cdot 10^{-5}\cdot 30 = 3.3\cdot 10^{-4} \quad (8)$$

By applying the relationship (6) with the value $\delta n$ indicated by the relationship (8), the following is obtained:

$$L = \frac{\delta\tau\cdot c}{\delta n} = \frac{10^{-12} \text{ s}\cdot 3\cdot 10^8 \text{ ms}^{-1}}{3.3\cdot 10^{-4}} = 0.91 \text{ m} \quad (9)$$

Accordingly, to obtain 1 ps variation of time delay due to 30° C. temperature variation, the total length of the coils 8 is L=0.91 m.

Similarly, with reference to FIG. 5, the length L=0.91 [m] can be also considered as the optical length difference between the coils of a reel and the coils of reel adjacent thereto. To have a preset deflection of the beam, the total delay between the first and the last optical paths is, in accordance to what has been illustrated in the preceding example, $\Delta\tau=(N-1)\cdot\delta\tau=(10-1)\cdot 10^{-12}$ [s]=9 [ps] and the difference in the total length between the coils of the first reel and the coils of the last reel is $\Delta L=(N-1)\cdot L=(10-1)\cdot 0.91$ [m]=8.2 [m].

It should be observed that the exemplary values indicated above for the length L and the temperature variation $\Delta T$ are compatible with the practical applications described above.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A phase shift device for phase shifting an optical fiber signal of an optical fiber portion comprising:
   an actuator for changing the signal phase of said optical fiber signal using a thermo-optical effect to elongate or stress said at optical fiber portion;
   a transducer for generating an electric measuring signal indicating the temperature of said optical fiber portion; and
   a control block suitable to control, based on the electric measuring signal, the actuator for adjusting the phase change value of the optical signal.

2. The device according to claim 1, wherein the phase change value of the optical signal is kept substantially constant when the temperature is changed.

3. An antenna system comprising:
   a source device suitable to provide optical signals to a plurality of optical fibers;
   a phase shift apparatus comprising a plurality of phase devices each comprising a thermo-optical actuating means operative to introduce a phase change of the corresponding optical signal of an associated optical fiber by elongating or stressing said associated optical fiber;
   a conversion block for converting the optical signals resulting from the phase shift apparatus into a plurality of electric signals; and
   an array of antenna elements for generating, from the plurality of electric signals, an irradiated signal.

4. The antenna system according to claim 3, wherein the optical fibers have respective first portions that can be conditioned by thermo-optical effect, having distinct lengths, such that the actuating means introduces respective phase changes on the optical signals that are different from each other.

5. The antenna system according to claim 4, wherein the first conditionable portions are windings of the respective optical fibers in a distinct number of coils.

6. The antenna system according to claim 5, wherein the windings are arranged about corresponding portions of a reel, the reel being in common with the plurality of phase shift devices.

7. The antenna system according to claim 5, wherein each of said windings is arranged about a respective support reel.

8. The antenna system according to claim 3, further comprising a control block suitable to control the plurality of phase shift devices to introduce phase changes that vary over time such that the irradiated signal carries out a space scanning.

9. The antenna system according to claim 8, wherein said control block is such as to control the plurality of phase shift devices to carry out a space scanning within a first angular sector, the phase shift apparatus comprising a further plurality of phase shift devices to be controlled by the control block independently from the plurality of devices and being such as to carry out a space scanning of the irradiated signal within a second angular sector.

10. The antenna system according to claim 4, wherein the further plurality of phase shift devices introduces phase changes of the optical signals by acting on second portions to be conditioned by thermo-optical effect of the optical fibers, the sum of the length of a first conditional portion and the length of a second conditionable portion being substantially the same for each optical fiber.

11. The antenna system according to claim 8, wherein said control block, based on electric measuring signal keeps substantially unchanged at least the orientation of the radiation solid associated to the irradiated signal.

12. The antenna system according to claim 8, further comprising a receiving block electrically coupled to said array of antenna elements for receiving a detection electric signal correlated with a reflected component of the irradiated signal.

13. The antenna system according to claim 3, wherein said source device comprises a laser for generating an optical signal and a splitter for dividing said optical signal into the plurality of optical signals.

14. The antenna system according to claim 3, further comprising an amplification block of the electric signals interposed between the conversion block and the array of antenna elements.

15. The antenna system according to claim 12, configured to operate as a radar for motor vehicles and to carry out a scanning on a moving plane of the motor vehicle by means of the irradiated signal.

16. An antenna system comprising:
   a source device for providing optical signals to a plurality of optical fibers;
   a phase shift apparatus comprising a plurality of phase devices each comprising a thermo-optical actuator to introduce a phase change of the corresponding optical signal in a first conditional portion of an associated optical fiber of a plurality of optical fibers;
   a conversion block for converting the optical signals resulting from the phase shift apparatus into a plurality of electric signals; and
   an array of antenna elements for generating an irradiated signal from the plurality of electric signals,
   wherein each of the plurality of optical fibers has a distinct length such that each thermo-optical actuators introduces a respective phase change of the corresponding optical signal that is different from other phase changes introduced in the other optical signals, and the first conditionable portions constitute windings each having a distinct number of coils arranged about of a support structure.

17. An antenna system comprising:
   a source device for providing optical signals to a plurality of optical fibers;
   a phase shift apparatus comprising a plurality of a thermo-optical actuators each operative to introduce a phase change of a corresponding optical signal associated with one of the plurality of optical fibers;
   a conversion block for converting the optical signals resulting from the phase shift apparatus into a plurality of electric signals;
   an array of antenna elements for generating an irradiated signal from the plurality of electric signals; and
   an amplification block of the electric signals interposed between the conversion block and the array of antenna elements.

* * * * *

UNITED STATES PATENT AND TRADEMARK OFFICE
CERTIFICATE OF CORRECTION

PATENT NO. : 7,676,120 B2
APPLICATION NO. : 12/372583
DATED : March 9, 2010
INVENTOR(S) : Guido Chiaretti et al.

Page 1 of 1

It is certified that error appears in the above-identified patent and that said Letters Patent is hereby corrected as shown below:

Column 13, line 15, delete "at"

Signed and Sealed this
Twenty-second Day of November, 2011

David J. Kappos
*Director of the United States Patent and Trademark Office*